United States Patent
Levoy et al.

(10) Patent No.: US 9,013,592 B2
(45) Date of Patent: *Apr. 21, 2015

(54) METHOD, APPARATUS, AND COMPUTER PROGRAM PRODUCT FOR PRESENTING BURST IMAGES

(71) Applicant: Nokia Corporation, Espoo (FI)

(72) Inventors: Marc Levoy, Stanford, CA (US); Natasha Gelfand, Sunnyvale, CA (US); Wei-Chao Chen, Los Altos, CA (US); Kari Antero Pulli, Palo Alto, CA (US)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/944,372

(22) Filed: Jul. 17, 2013

(65) Prior Publication Data

US 2013/0300910 A1   Nov. 14, 2013

Related U.S. Application Data

(63) Continuation of application No. 12/137,073, filed on Jun. 11, 2008, now Pat. No. 8,497,920.

(51) Int. Cl.
*H04N 5/228* (2006.01)
*H04N 5/232* (2006.01)
*H04N 5/235* (2006.01)
(Continued)

(52) U.S. Cl.
CPC ....... *H04N 5/23293* (2013.01); *H04N 5/23212* (2013.01); *H04N 5/23216* (2013.01); *H04N 5/23222* (2013.01); *H04N 5/23232* (2013.01); *H04N 5/235* (2013.01); *H04N 5/2355* (2013.01);
(Continued)

(58) Field of Classification Search
None
See application file for complete search history.

(56) References Cited

U.S. PATENT DOCUMENTS 5,982,953 A   11/1999   Yanagita et al.
6,313,877 B1  11/2001   Anderson
(Continued)

FOREIGN PATENT DOCUMENTS

CN   1414786 A        4/2003
DE   102004047928 A1  4/2006
(Continued)

OTHER PUBLICATIONS

Search Report and Written Opinion for PCT/FI2009/050427 dated Sep. 22, 2009.
(Continued)

*Primary Examiner* — Luong T Nguyen
(74) *Attorney, Agent, or Firm* — Alston & Bird LLP (57) ABSTRACT

An apparatus, method and computer program product for presenting burst images are provided. The apparatus may include a processor that may be configured to receive a plurality of burst images. Each burst image may differ from the other burst images based on a variable parameter. The processor may also be configured to provide for a presentation of a sample burst image. In this regard, the sample burst image may be one of the plurality of burst images. The processor may be further configured to receive a selected location within the presentation of the sample burst image and provide for a presentation of a plurality of burst image fragments associated with each of the plurality of burst images. In this regard, the burst image fragments may be portions of each of the burst images, where the areas of each burst image may be determined based on the selected location.

20 Claims, 5 Drawing Sheets (51) Int. Cl.
*H04N 5/77* (2006.01)
*H04N 5/765* (2006.01)
*H04N 5/775* (2006.01)
*H04N 9/804* (2006.01)

(52) U.S. Cl.
CPC ............... *H04N 5/772* (2013.01); *H04N 5/765* (2013.01); *H04N 5/775* (2013.01); *H04N 9/8047* (2013.01)

(56) References Cited

U.S. PATENT DOCUMENTS

| | | | |
|---|---|---|---|
| 6,445,415 | B1 | 9/2002 | Olsson |
| 7,787,026 | B1 * | 8/2010 | Flory et al. ............... 348/231.99 |
| 2002/0140827 | A1 | 10/2002 | Okisu et al. |
| 2003/0076312 | A1 | 4/2003 | Yokoyama |
| 2003/0151679 | A1 | 8/2003 | Amerson et al. |
| 2005/0030315 | A1 | 2/2005 | Cohen et al. |
| 2005/0219386 | A1 * | 10/2005 | Stavely et al. ............. 348/240.3 |
| 2005/0219391 | A1 | 10/2005 | Sun et al. |
| 2006/0158462 | A1 | 7/2006 | Toyama et al. |
| 2006/0224461 | A1 | 10/2006 | Montulli et al. |
| 2007/0003152 | A1 | 1/2007 | Hoppe et al. |
| 2009/0256947 | A1 * | 10/2009 | Ciurea et al. ............. 348/333.12 |
| 2009/0290037 | A1 * | 11/2009 | Pore ........................... 348/222.1 |

FOREIGN PATENT DOCUMENTS

| | | | |
|---|---|---|---|
| EP | 1 324 587 | A2 | 7/2003 |
| EP | 1 883 227 | A2 | 1/2008 |
| JP | 10-150620 | | 6/1998 |
| JP | 2003-099021 | | 4/2003 |
| JP | 2006-229663 | * | 8/2006 |
| JP | 2008-000536 | | 1/2008 |
| WO | WO-00/08853 | A1 | 2/2000 |
| WO | WO 2007/038198 | A2 | 4/2007 |

OTHER PUBLICATIONS

Extended European Search Report from related European Patent Appl. No. 09761847.4, dated May 13, 2011.
Light Field camera | Lytro, [online] [retrieved Aug. 24, 2011]. Retrieved from the Internet: <URL: www.refocusimaging.com, redirected to http://www.lytro.com/>. 6 pages.
Agarwala, A. et al., *Interactive Digital Photomontage*, Proceedings of SIGGRAPH, (2004) pp. 1-9.
Office Action for Chinese Application No. 200980116497.0 dated Jul. 16, 2012.
Coumou, David et al. *2006 Western New York Image Processing Workshop*, IEEE Signal Processing Society (2006) 69 pages.
Matthews, Kristine E. et al. *Simultaneous Motion Parameter Estimation and Image Segmentation Using the Em Algorithm*, The Catholic University of America (1995) 4 pages.
Li, Shutao et al. *Multifocus Image Fusion Using Region Segmentation and Spatial Frequency*, Image and Vision Computing 26 (2008) 9 pages.
Lischinski, D. et al., *Interactive Local Adjustment of Tonal Values*, Proceedings of SIGGRAPH, (2006) 6 pages.
Wandell, Brian et al. *Multiple Capture Single Image Architecture with a CMOS Sensor*, Society of Multispectral Imaging of Japan (1999) 7 pages.

* cited by examiner

METHOD, APPARATUS, AND COMPUTER PROGRAM PRODUCT FOR PRESENTING BURST IMAGES

CROSS REFERENCE TO RELATED APPLICATION

This application is a continuation of and claims priority to U.S. application Ser. No. 12/137,073, filed Jun. 11, 2008, the entire contents of which are hereby incorporated by reference.

TECHNICAL FIELD

Embodiments of the present invention relate generally to presenting images and, more particularly, relate to an apparatus, method, and a computer program product for presenting burst images.

BACKGROUND

Many digital cameras, including digital cameras incorporated into cell phones, now provide burst image capturing capabilities. In a burst image capturing mode, a digital camera typically captures many images in rapid succession. The images captured in a burst mode make up a burst of images or an image stack, where each individual image within the burst of images or the image stack may be referred to as a burst image. In capturing a burst of images, some parameter may be varied across each of the burst images.

A common example is exposure bracketing. Many cameras allow a photographer to take a set of photos (e.g., two or more) in fast succession. The first burst image may be exposed as metered by the camera. The second image may be overexposed by some pre-determined amount, possibly specified by the photographer, and the third burst image may be underexposed by the same amount. Many photographers also use exposure bracketing as a means for checking a digital camera's metering. The photographer may take three burst images with the intent of keeping only one, and choose the most desirable burst image of the burst and discard the other two.

Exposure bracketed bursts may also form the basis for High Dynamic Range (HDR) imaging, a technique where differently exposed images are combined into a single image that is well exposed throughout the image. For example, a photographer may use a burst mode on a digital camera to capture three burst images where the first image has the foreground well exposed, the second image has the background well exposed, and the third image has an area between the foreground and background well exposed. In this regard, using HDR imaging portions of the each the images may be combined to create a composite image that is well exposed throughout.

Another parameter than can be varied across a burst of images can be focus. In this regard, a burst of images may be captured where each burst image includes a different area in focus, or each image has a different focal length. These images may also be combined into a composite of the burst images to create an image that is in focus throughout the composite image. Bursts of images with varying focus may also occur when burst images are captured of fast moving action. The photographer may pan the camera to keep the subject in the center of the scene, but auto-focus features may not always follow and maintain focus on the subject.

Further, burst modes on digital cameras may also be utilized in situations where a rapid succession of burst images are captured in an attempt to capture a single burst image that is desirable with respect to the positioning or other attributes of the subjects within the burst images. The classic example is attempting to capture an image of a group of people where everyone is smiling. A burst of images may include a single image within the burst that is desirable in this regard. A photographer may select the desirable burst image and discard the remaining images. Another possibility may be that there is no single image where everyone smiles, though everyone smiles in some image. Then the task may be to select the pieces of each burst image that can be combined into a new synthesized image that is more desirable than any of the input images.

While burst mode photography can be very useful, problems can arise in the selection of desirable burst images. Individual photos in a burst are usually very similar, with some parameters such as focus, exposure, or the state of the targets (e.g., smiling or frowning) varying through each of the burst images. Oftentimes, the photographer must examine the resulting burst of images to select a desirable image. The process of selecting a desirable burst image can be a tedious process. The process can involve flipping back and forth through the burst of images several times to select a desirable image. The process can be increasingly difficult and tedious on a device with a small display screen that is common on many digital cameras, cell phones, and other mobile devices incorporating a digital camera. Photographers often resort to repeatedly zooming, panning, and flipping though the burst images while having to remember desirable and undesirable aspects of the various images. As described above, a photographer may also want to create a composite image incorporating different portions from different burst images. Identifying the desired burst images and the desired portions of the images may also involve tediously zooming, panning, and flipping though the burst images.

Thus, there is a need for an image display interface that allows for an improved ability to view and select pieces of burst images. Additionally, there is a need for an image display interface that allows for an improved ability to view burst images on a small display.

BRIEF SUMMARY

A method, apparatus, and computer program product are therefore described that address at least the needs described above by providing for the presentation of burst images. In this regard, exemplary embodiments of the present invention may provide for the presentation of magnified fragments of a plurality of burst images, together with a sample image. A selector may be used in combination with the sample image to change the location depicted in the magnified fragments. As such, the sample image may be utilized as a map, and details of all or some of the burst images may be simultaneously visually compared via the magnified fragments on a single display.

In this regard, exemplary embodiments of the present invention may receive a plurality of burst images, wherein each burst image in the plurality of burst images may differ from the other burst images based on a parameter, such as, but not limited to, exposure, focus, and/or time, or based on the state of a target or targets in the image (such as the facial expression of a person, or which parts of the background are occluded by a moving object such as a car or a person). Exemplary embodiments may also provide for a presentation of a sample burst image. In this regard, the sample burst image may be one of the plurality of burst images and, in some exemplary embodiments, presentation of the sample burst image may substantially consume a display screen or window. Various exemplary embodiments may also receive a selected location within the presentation of the sample burst image. The selected location may be received from a user interface device, such as, but not limited to, a mouse, a stylus, a touch-screen, or the like. Various exemplary embodiments may also provide for the presentation of a plurality of burst image fragments associated with each of the plurality of burst images. The burst image fragments may be presentations of areas of each of the burst images. The areas depicted in each of the burst image fragments may be determined based on the selected location. Accordingly, changing the selected location within the sample burst image may result in presenting a different area of the other burst images within the burst image fragments.

In some exemplary embodiments of the present invention, a selection of a segment of a particular burst image may be received. The particular image may be selected because that burst image fragment is desirable to a user for various reasons based on, for example, exposure of the particular burst image, focus of the burst image, the subjects within the burst image, or the like. In various exemplary embodiments, the particular burst image that is selected may be associated with the selected location on the sample burst image. In this regard, in some exemplary embodiments, a composite image may be generated based on the particular burst image and the selected location.

In one exemplary embodiment, a method the presentation of burst images is described. The exemplary method may include providing for a presentation of a sample burst image. In this regard, the sample burst image may be a one of the plurality of burst images. The exemplary method may also include receiving a selected location within the presentation of the sample burst image and providing for a presentation of a plurality of burst image fragments associated with respective ones of the burst images. In this regard, the burst image fragments may be portions of respective ones of the burst images and the portions of each of the burst images may be determined based on the selected location.

In another exemplary embodiment an apparatus for the presentation of burst images is described. The apparatus may comprise a processor. The processor may be configured to provide for a presentation of a sample burst image. In this regard, the sample burst image may be one of a plurality of burst images. The processor may also be configured to receive a selected location within the presentation of the sample burst image and provide for a presentation of a plurality of burst image fragments associated with respective ones of the burst images. In this regard, the burst image fragments may be portions of respective ones of the burst images. Further, the portions of each burst image may be determined based on the selected location.

In another exemplary embodiment, a computer program product for the presentation of burst images is described. The computer program product may comprise at least one computer-readable storage medium having executable computer-readable program code portions stored therein. The computer-readable program code portions may comprise a first program code portion, a second program code portion, and a third program code portion. The first program code portion may be configured to provide for a presentation of a sample burst image. In this regard, the sample burst image may be one of a plurality of burst images. The second program code portion configured to receive a selected location within the presentation of the sample burst image and the third program code portion may be configured to provide for a presentation of a plurality of burst image fragments associated with respective ones of the burst images. In this regard, the burst image fragments may be portions of respective ones of the burst images. Further, the portions of each burst image may be determined based on the selected location.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Further, the term "exemplary" as used herein is defined to indicate an example, and should not be construed to indicate a qualitative assessment.

Figure 1:
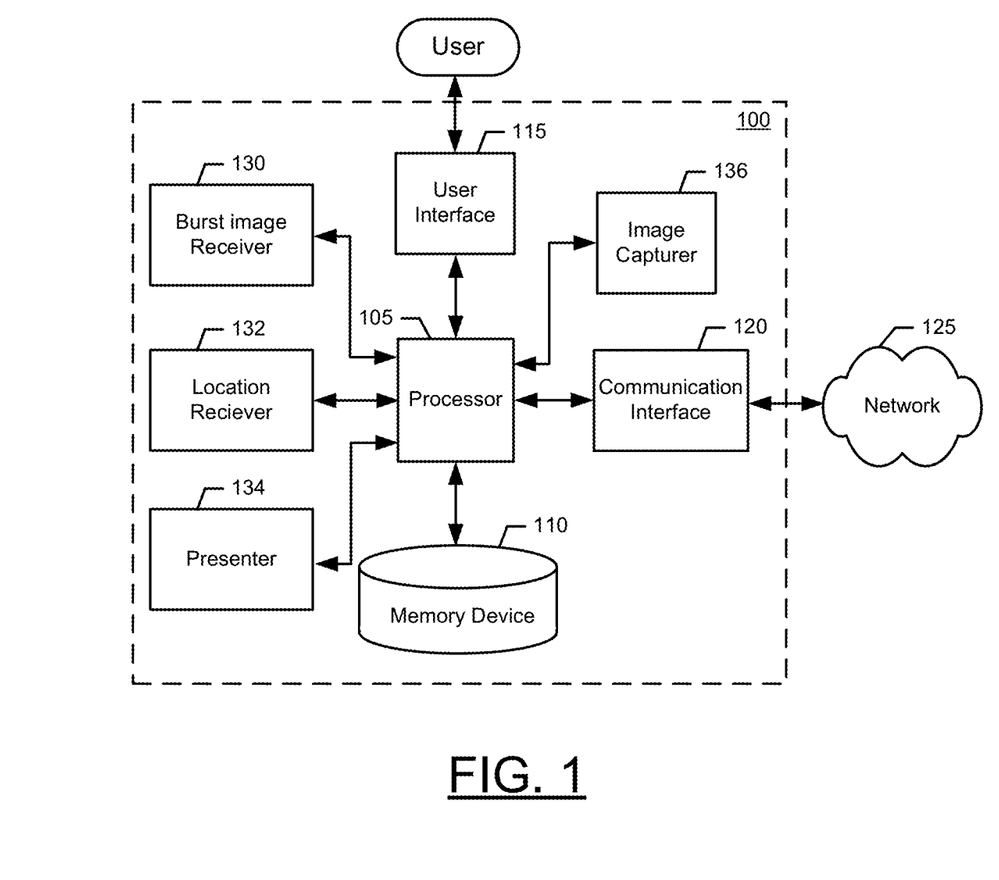
FIG. 1 is a schematic block diagram of an apparatus for presenting burst images according to an exemplary embodiment of the present invention.

FIG. 1 depicts an exemplary apparatus 100 for presenting burst images according to various exemplary embodiments of the present invention. Apparatus 100 may be embodied as any computing device, such as, a digital camera, a cell phone, a media player, a media viewer, an personal organizer, a computer system, a mobile terminal, a server, a touch enabled device (e.g., a device including a touch screen display), a portable or laptop computer, a global positioning system (GPS) enabled device, other network device, or the like. The apparatus 100 may include or otherwise be in communication with a processor 105, a user interface 115, a communication interface 120, and a memory device 110. The memory device 110 may include, for example, volatile and/or non-volatile memory. The memory device 110 may be configured to store information, data, applications, instructions, or the like for enabling the apparatus to carry out various functions in accordance with exemplary embodiments of the present invention. For example, the memory device 110 could be configured to buffer input data for processing by the processor 105. Additionally or alternatively, the memory device 110 could be configured to store instructions for execution by the processor 105. As yet another alternative, the memory device 110 may be one of a plurality of data stores including, for example, databases, that store information in the form of static and/or dynamic information. In this regard, the information stored in the memory device 110 may include, for example, burst images, burst image files, location selections, selections of burst images, or the like.

The processor 105 may be embodied in a number of different ways. For example, the processor 105 may be embodied as a microprocessor, a coprocessor, a controller, or various other processing means or elements including integrated circuits such as, for example, an ASIC (application specific integrated circuit) or FPGA (field programmable gate array). In an exemplary embodiment, the processor 105 may be configured to execute instructions stored in the memory device 110 or otherwise accessible to the processor 105.

The user interface 115 may be in communication with the processor 105 to receive an indication of a user input at the user interface 115 and/or to provide an audible, visual, mechanical, or other output to the user. As such, the user interface 115 may include, for example, a keyboard, a mouse, a joystick, a microphone, a speaker, or other input/output mechanisms. The user interface 115 may also include a display, which may be embodied as a touch screen display, a conventional display, or the like. In an exemplary embodiment, such as one where the apparatus 100 is a computer system or a server, the user interface 115 may be remote from the processor 105. In some exemplary embodiments, user interface 115 may have access to the processor 105 via a network, such as network 125.

In some exemplary embodiments, the apparatus 100 may include a communication interface 120 embodied as any device or means embodied in either hardware, software, or a combination of hardware and software that is configured to receive and/or transmit data from/to a network and/or any other device or module in communication with the apparatus 100. In this regard, the communication interface 120 may include, for example, an antenna, a transmitter, a receiver, a transceiver and/or supporting hardware or software for enabling communications with network 125, which may be any type of wired or wireless network. Various other network entities may be connected to the network 125, and communications may occur between the apparatus 100 and the other network entities.

In some exemplary embodiments, the apparatus 100 may include a media capturer 136, such as a camera, video, and/or audio module, in communication with the processor 105. The media capturer 136 may be any means for capturing images, video and/or audio for storage, display, or transmission. For example, in an exemplary embodiment in which the media capturer 136 is a camera module, the media capturer 136 may include a burst capture mode where the camera module may capture a plurality of images. A plurality of images captured in burst mode may be referred to as a burst of images, or an image stack, and each image within the plurality of images captured in burst mode may be referred to as a burst image. In this regard, when the media capturer 136 is in the burst capture mode, burst images may be captured in rapid succession. In some embodiments, the burst images may captured in response to a single command, such as, for example, a pressing of a capture button on the user interface 115. Further, the media capturer 136 may vary one or more parameters across the plurality of burst images, such as, exposure, focus, or the like. In some exemplary embodiments, the burst images may vary with regard to the time the images were captured. As such, the image capturer 136 may include all hardware, such as a lens or other optical component(s), and software necessary for capturing an image and creating an image file from the captured image. The image file may be a bitmap, a joint photographic experts group (JPEG), or other format. In some exemplary embodiments, the image capturer 136 may store the image files on the memory device 110.

Image capturer 136 may also include all hardware, such as a lens or other optical component(s), and software necessary to provide for image zooming functionality. Zooming may refer to the enlarging (i.e., magnifying) or reducing (i.e., de-magnifying) of a presentation of an image or a portion of an image. In some exemplary embodiments, processor 105 may also assist in image zooming functionality. Image zooming functionality can include the ability to magnify or de-magnify an image prior to or subsequent to capturing an image.

The image capturer 136 may also include all hardware and software necessary to provide for focusing an image. In this regard, image capturer 136 may include the ability to perform auto-focusing of an image prior to capturing, and/or the ability to automatically or manually change the focusing while capturing images.

The image capturer 136 may also include all hardware and software necessary to provide for timed exposure of an image during capturing. In this regard, image capturer 136 may include the ability to perform auto-exposure functionality to determine a desired exposure level for captured images. In some exemplary embodiments, the image capturer 136 may also be configured to automatically or manually change the exposure while capturing images.

The burst image receiver 130, the location receiver 132, and the presenter 134 of apparatus 100 may be any means or device embodied in hardware, software, or a combination of hardware and software that is configured to carry out the functions of the burst image receiver 130, the location receiver 132, and the presenter 134, respectively, as described herein. In an exemplary embodiment, the processor 105 may include, or otherwise control the burst image receiver 130, the location receiver 132, and/or the presenter 134.

The burst image receiver 130 may be configured to receive a plurality of burst images. In this regard, the apparatus 100 may include various means for receiving the plurality of burst images, which may include the processor 105, the burst image receiver 130, a receiver, algorithms executed by the foregoing or other elements for receiving a plurality of burst images described herein and/or the like. In some exemplary embodiments, the burst image receiver 130 may receive the plurality of burst images from the image capturer 136, the memory device 110, or from a remote network entity via the network 125.

In some exemplary embodiments, the plurality of received burst images may be images that were captured in rapid succession. Moreover, each of the plurality of burst images may differ in that the images were captured at different times. Accordingly, in some exemplary embodiments, image capturer 136 and/or processor 105 may be configured to capture burst images at a user-defined capture rate. For example, the image capturer 136 may be configured to capture a burst image every fifth of a second. As such, due to movement in the subjects of the image over the time frame, variations in the burst images may occur.

In some exemplary embodiments, the plurality of received burst images may be images having a varying focus parameter. A focus parameter may be a value or other indication of the focus associated with a given image. Burst images having the foreground in focus may have a different focus parameter than burst images having the background in focus. In this regard, in some exemplary embodiments, a plurality of burst images that vary based on a focus parameter may each include substantially the same image with only the focus parameter being varied. In some exemplary embodiments, the focus parameter may be indicative of the distance between a lens and an image capturing surface. The focus parameter may have been changed incrementally or decrementally by a fixed amount for each burst image, the focus value may have been automatically changed based on the distances of various subjects (foreground subjects and/or background subjects) within the image to be captured, or manual changing of the focus may be utilized. Accordingly, in some exemplary embodiments, image capturer 136 and/or processor 105 may be configured to capture burst images where the burst images differ by a determined focus parameter.

In some exemplary embodiments, the plurality of received burst images may be images having a varying exposure parameter. An exposure parameter may be a value or other indication of the exposure associated with a given image. In some exemplary embodiments, a plurality of burst images that vary based on an exposure parameter may each include substantially the same image with only the exposure parameter being varied. In some exemplary embodiments, the exposure parameter may be indicative of the shutter speed and/or aperture for a given image. The exposure parameter may have been changed incrementally or decrementally by a fixed amount for each burst image or the exposure parameter may have been dynamically determined based on the light or brightness of the area to be captured. Accordingly, in some exemplary embodiments, image capturer 136 and/or processor 105 may be configured to capture burst images where the burst images differ by a determined exposure parameter.

In some exemplary embodiments, the plurality of burst images may include burst images that differ across a variety of parameters. As such, a plurality of burst images may include burst images that differ based on focus, exposure, and the like. Further, a plurality of burst images may be any collection of images. In this regard, the plurality of burst images may have some common characteristic or no common characteristic. Additionally, images with the plurality of burst images may be received from different devices. In this regard, different camera device may have captured the images. Further, a plurality of burst images may include two or more images. Also, in some exemplary embodiments, an image, such as, for example, an HDR image that is already tone-mapped, may be used as a source for generating a plurality of burst images by applying varying gain settings to the image to generate the plurality of burst images.

The presenter 134 of apparatus 100 may be configured to provide for the presentation of a sample burst image. In this regard, the sample burst image may be one of the plurality of burst images. The apparatus 100 may include various means for providing for the presentation of a sample burst image, which may include the processor 105, the presenter 134, the user interface 115, a display (e.g., a touch screen display or a conventional display), algorithms executed by the foregoing or other elements for providing for the presentation of a sample burst image described herein and/or the like. The sample burst image may be selected from the plurality of burst images based on any criteria, such as, focus, exposure, timing, or the like. In some exemplary embodiments, the sample burst image may be randomly or pseudo-randomly selected from the plurality of burst images.

In some exemplary embodiments, presentation of the sample burst image may be substantially maximized to the size of the frame of the display associated with the user interface 115 or maximized to the size of a window the sample image is being presented in. As such, the resolution of the sample image may be maximized while also allowing for the entire sample image to be included in the frame of the display or the window.

The location receiver 132 may be configured to receive a selected location within the presentation of the sample burst image. In this regard, the apparatus 100 may include various means for receiving the selected location, which may include the processor 105, the location receiver 133, the user interface 115, a display (e.g., a touch screen display or a conventional display), algorithms executed by the foregoing or other elements for receiving the selected location described herein and/or the like. In this regard, a user of apparatus 100 may select a location within the presentation of the sample burst image via the user interface 115. According to various exemplary embodiments, the location may be selected by interacting with a touch screen (e.g., touching or tapping with or without a stylus), clicking on the desired location using a mouse and a mouse pointer, or the like.

In various exemplary embodiments, the sample burst image may be presented in association with a coordinate grid or other means for determining a location within the presented sample burst image. When a user selects a location within the presentation of the sample burst image, selected location data (e.g., location coordinates or other location indicators) may be captured with respect to the selected location. The user interface 115 may communicate the selected location data to the processor 105 and/or the location receiver 132 to be received by the processor 105 and/or the location receiver 132. Moreover, in some exemplary embodiments, the selected location within the presentation of the sample burst image may be received from a touch screen display.

Presenter 134 may also be configured to provide for a presentation of a plurality of burst image fragments associated with respective ones of the burst images. In this regard, the apparatus 100 may include various means for providing for the presentation of a plurality of burst image fragments, which may include the processor 105, the presenter 134, the user interface 115, a display (e.g., a touch screen display or a conventional display), algorithms executed by the foregoing or other elements for providing for the presentation of a plurality of burst image fragments described herein and/or the like.

A burst image fragment may be a cropped portion or area of a respective burst image. For example, a burst image may have an associated given size and the burst image fragment may be a portion one tenth the size of the entire burst image. The size of the portion associated with a burst image fragment may be dependant on a number of criteria. For example, the size of a burst image fragment may be dependant upon the size of the display screen. Further, the size of a burst image fragment may be dependant on the number of burst images within the plurality of burst images. In this regard, since some or all of the plurality of burst images may have associated burst image fragments, screen space may become limited with additional burst image fragments. As such the burst image fragments may be sized smaller to accommodate smaller displays and/or larger numbers of presented burst image fragments.

In some exemplary embodiments, the burst image fragment may also be magnified (or de-magnified), or the content of the burst image fragment may be enlarged (or reduced) relative to the underlying burst image. In this regard, the amount of magnification (e.g., 0.1×, 2×, 10×, etc.) may be relative to the presentation of the sample burst image. In some exemplary embodiments, the amount of magnification for all of the burst image fragments may be the same. Further, in some exemplary embodiments, the amount of magnification may be user-defined via the user interface 115. In other exemplary embodiments, the amount of magnification may be defined by the resolution of the burst image. In this regard, some exemplary embodiments may present the burst image fragments in full resolution (i.e., the resolution of the captured burst image). In this regard, in some exemplary embodiments, the burst image fragments may be provided in full resolution when the burst images vary based on a focus parameter.

The portion associated with the burst image fragments may be determined based on the selected location within the presentation of the sample image. In some exemplary embodiments, the area associated with each of the burst image fragments may be determined using the selected location of the presented sample image as a center point. In this regard, each of the plurality of burst images may be associated with a coordinate grid or other means for determining a location within each burst image that is related to the coordinate grid or other means for determining a location with respect to the presentation of the sample burst image. As a result, in some exemplary embodiments, the burst image fragments may depict a portion of each of the burst images that is centered at the selected location.

Figure 2:
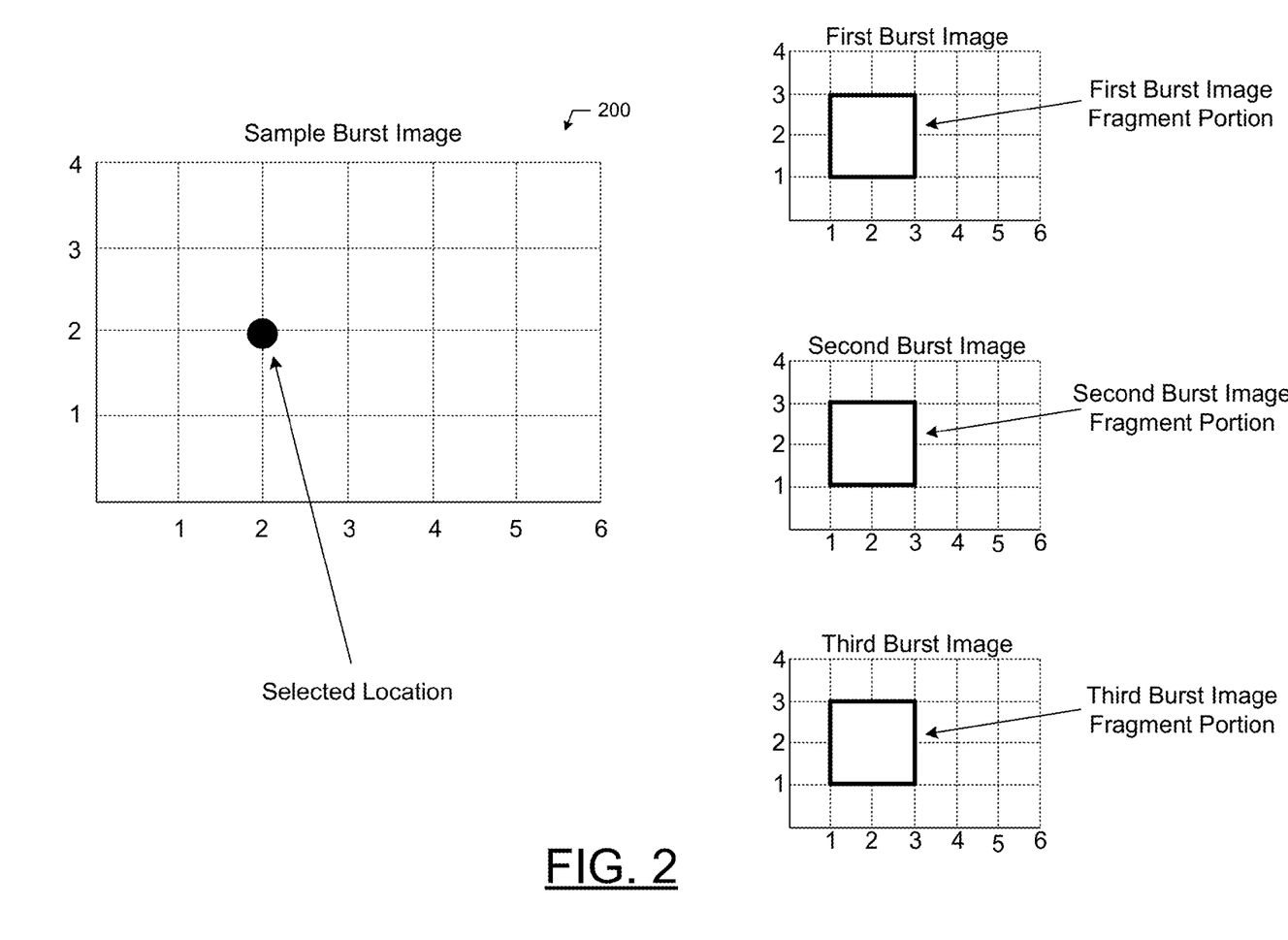
FIG. 2 illustrates the areas associated with a plurality of burst image fragments according to an exemplary embodiment of the current invention.

For example, consider a coordinate grid that is associated with a first, second, and third burst image that is zero to four units on the y-axis and zero to six units on the x-axis as depicted in FIG. 2. In this exemplary scenario one of the burst images may be utilized as the sample burst image and a presentation of the sample burst image has been provided at 200 in association with a corresponding coordinate grid. (For illustration purposes the coordinate grids are included in FIG. 2 without a representation of actual images.) The selected location within the sample burst image is located at x equals 2 units and y equals two units. In this exemplary scenario, this coordinate point (i.e., (2,2)) may be reflected onto each of the first, second, and third burst images as a center point for determining the portion to be included in each of the first, second, and third burst image fragments. In this exemplary scenario, the portion of a burst image fragment is defined as a square of the size 2 units by 2 units. Accordingly, the sample image can be utilized as a map with respect to the plurality of burst images and can provide context to locations of interest.

While the previous example used the selected location as a center point, it is contemplated that the selected location may be offset by some predetermined value or have some other relationship to the portion of the burst images for use with the burst image fragments. Further, in some exemplary embodiments, the bounds of the burst images may not dictate the origin of a coordinate grid for all burst images. In these exemplary embodiments, an analysis of the burst images may be undertaken to orient each of the burst images on a common set of coordinate grids with respect to the contents of the images. Also, while the portions of the burst image fragments in FIG. 2 are squares, any shape (e.g., circles, rectangles, dynamic shapes, etc.) may be utilized.

Further, in some exemplary embodiments, the selected location may be changed to a new location. For example, using a touch screen, a user may drag her finger across the touch display screen. In this example, the selected location may be changing continuously as the user drags her finger across the display screen. As such, the portions associated and depicted in the burst image fragments will continuously change as the user's finger moves across the touch screen. As such, a user may readily navigate a multitude of burst images by updating the selected location via a touch screen or any other input device associated with the user interface 115.

Figure 3:
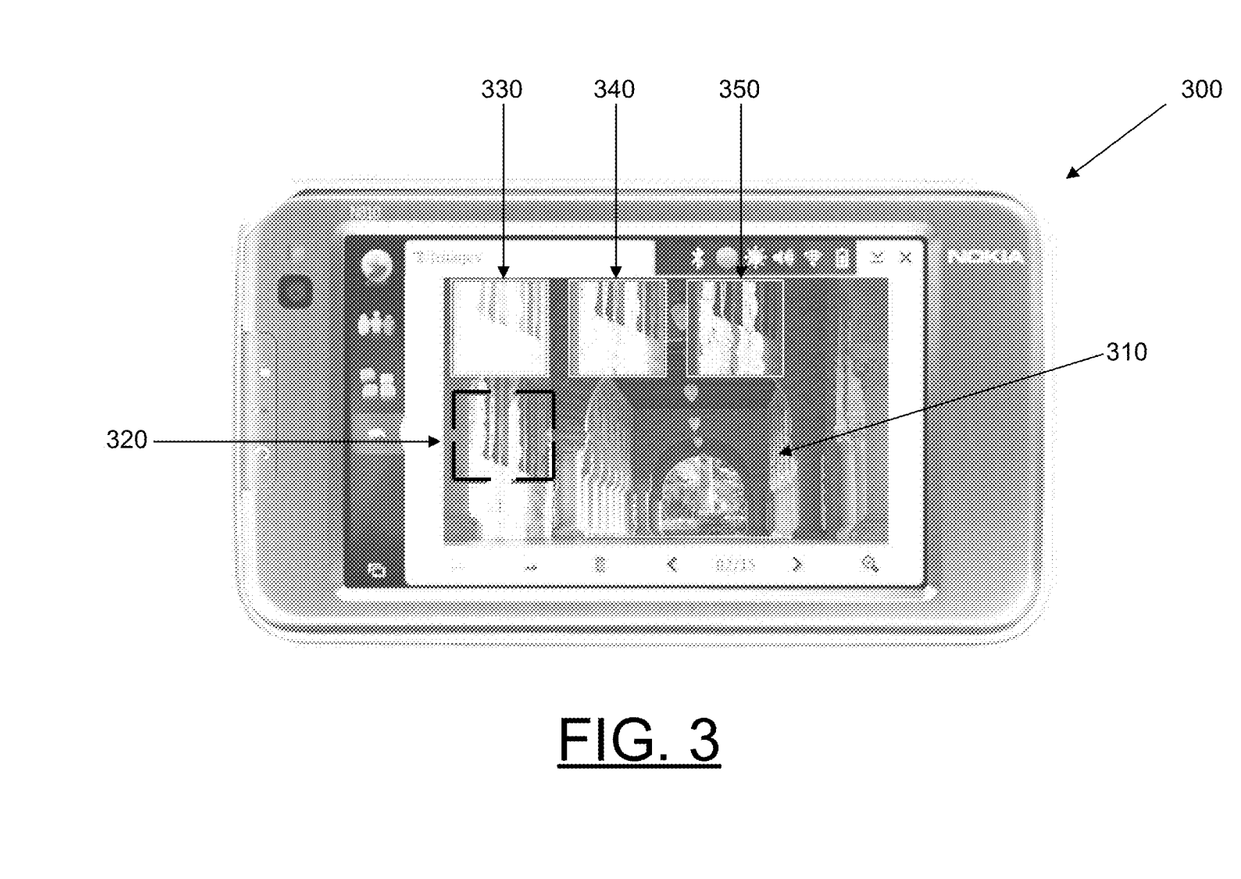
FIG. 3 illustrates a presentation of burst images fragments according to an exemplary embodiment of the present invention.

FIG. 3 illustrates a presentation of burst image fragments according to an exemplary embodiment of the present invention. The presentation of burst image fragments is displayed on a mobile terminal device 300. The display of the mobile terminal device is presenting a sample burst image 310. In FIG. 3, a selected location has been received as indicated by the boxed area 320. As such, the selected location defines a portion associated with the burst images and the corresponding portion for each of the burst images may be displayed as burst image fragments 330, 340, and 350. Note with respect to FIG. 3 the burst image fragments 330, 340, and 350 cover the upper portion of the sample burst image 310. In some exemplary embodiments, the presentations of the burst image fragments 330, 340, and 350 may be automatically or manually movable. Further, the presentations of the burst image fragments 330, 340, and 350 may be automatically or manually movable based on the selected location. In some exemplary embodiments, the presentations of the burst image fragments 330, 340, and 350 may be fixed. In this regard, the characteristics (e.g., size, aspect ratio, pixel density, or the like) may be considered. For example, if a selected location is located in the upper portion of the sample burst image, the presentations of the burst image fragments 330, 340, and 350 may be relocated to cover, for example, the lower portion of the sample burst image.

In some additional exemplary embodiments, the processor 105 may also be configured to receive a selection of a particular burst image. In this regard, the apparatus 100 may include various means for receiving a selection of a particular burst image, which may include the processor 105, the presenter 134, the user interface 115, a display (e.g., a touch screen display or a conventional display), algorithms executed by the foregoing or other elements for receiving a selection of a particular burst image described herein and/or the like. In this regard, a user may interact with the user interface 115 to select one of the burst images via the presentations of the burst image fragments. For example, a user may tap on a touch screen in the location of a particular burst image fragment to select the underlying burst image. The selection may be obtained by the user interface 115 and transmitted to the processor 105 to be received by the processor 105.

Further in this regard, the processor 105 may be configured to associate a previously selected location within the presentation of the sample burst image with the selected burst image. As described above, a portion relating to the selected location within the selected burst image may be defined based on the selected location.

In some exemplary embodiments, additional locations may be selected within the sample burst image and associated with additional selected burst images. In this manner, various selections of burst images associated with particular locations within those burst images may be received.

The processor 105 may also be configured to generate a composite image based on one or more selected burst images and the corresponding one or more selected locations associated with the selected burst images. In some exemplary embodiments, the processor may also be configured to provide for the presentation of the composite image after generation. In this regard, a composite image may be generated in any known manner. However, the inputs to the generation of the composite image may be derived for the selected burst images and the selected locations associated with the selected burst images.

For example, consider two burst images where the first burst image is in focus in the foreground and the second burst image is in focus in the background. A location in the foreground may be selected within the sample burst image, and the first burst image may be selected via the first burst image fragment. Subsequently, a location in the background may be selected within the sample burst image and the second burst image may be selected via the second burst image fragment. As a result, a composite image may be generated from the first and second burst images where the composite image is in focus throughout the image by taking the selected foreground portion from the first burst image and combining it with the selected background portion from the second burst image. While this example scenario contemplates selection of burst images and locations based on focus, aspects of the present invention may be applied to selection of burst images and locations based on any parameter. Exemplary embodiments of the present invention may also be utilized to select out of focus portions to be included in a composite image. Similar, examples are contemplated that are directed to a plurality of burst images with differing portions of desired exposure levels, and the like.

In some exemplary embodiments, the processor may be configured to add composite image to the plurality of burst images. In this regard, the composite image may be used as the sample image when providing for the presentation of the burst image fragments.

While the exemplary embodiments described above are directed to burst images, aspects of the present invention are equally applicable to non-image objects, items, parameters, or the like. For example, aspects of the present invention are applicable to editing functions such as contrast, color, and focus. In this regard, the plurality of burst image fragments may depict varying degrees of contrast, color, and/or focus. Further, exemplary embodiments of the present invention may also be applicable to browsing buttons, such as up, down, left, and right, as well as operating metaphors such as apply, undo, anchor, and history.

Figure 4:
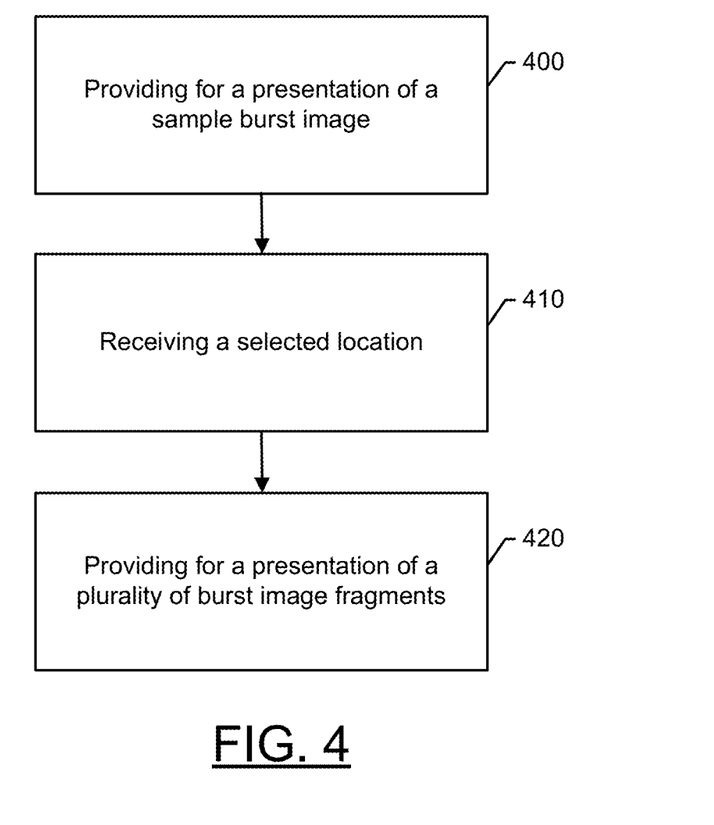
FIGS. 4 and 5 are flowcharts according to exemplary methods for presenting burst images according to exemplary embodiments of the present invention.
Figure 5:
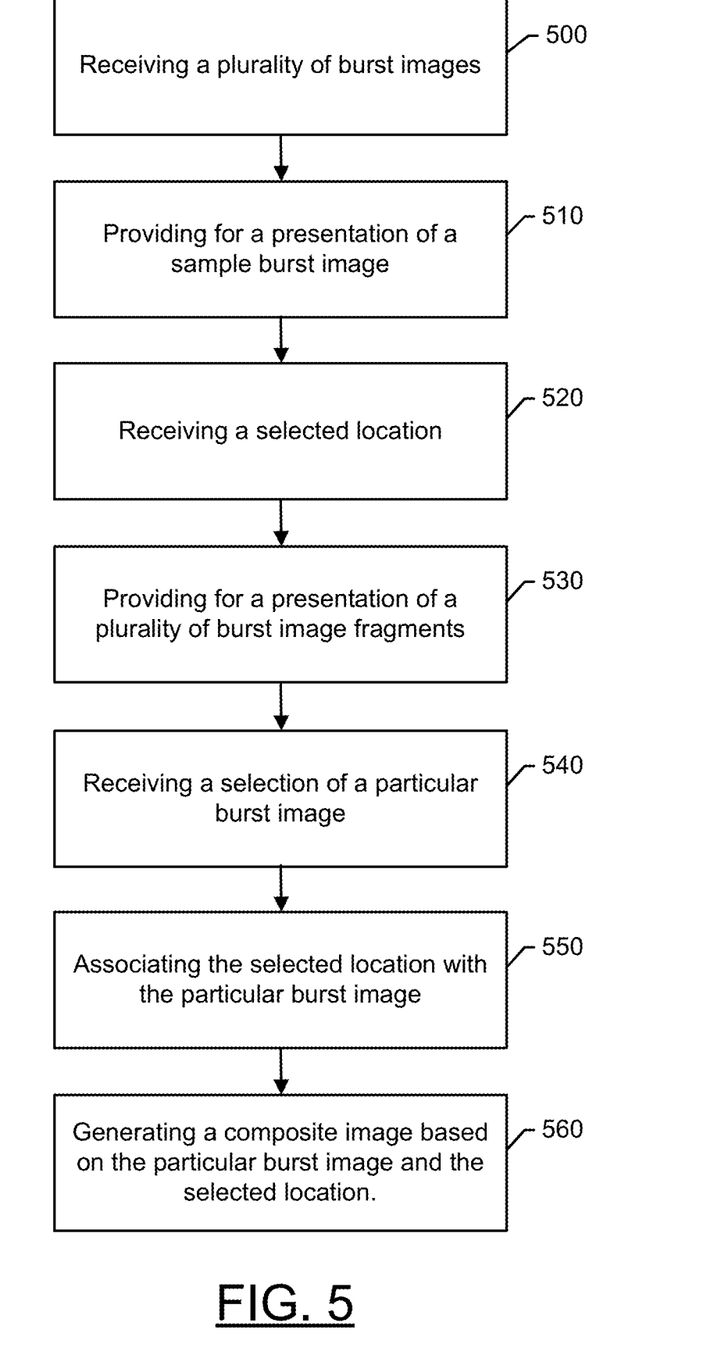

FIGS. 4 and 5 are flowcharts of a system, method, and program product according to exemplary embodiments of the invention. It will be understood that each block, step, or operation of the flowcharts, and combinations of blocks, steps or operations in the flowcharts, can be implemented by various means, such as hardware, firmware, and/or software including one or more computer program code portions, program instructions, or executable program code portions. For example, one or more of the procedures described above may be embodied by computer program code instructions. In this regard, the computer program instructions which embody the procedures described above may be stored by a memory device of the apparatus and executed by a processor in the apparatus. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s), step(s), or operation(s). These computer program instructions may also be stored in a computer-readable memory that can direct a computer, a processor, or other programmable apparatus to function in a particular manner, such that the instructions stored in the computer-readable memory produce an article of manufacture including instruction means which implement the function specified in the flowcharts block(s), step(s), or operation(s). The computer program instructions may also be loaded onto a computer, processor, or other programmable apparatus to cause a series of operational steps to be performed on the computer, processor, or other programmable apparatus to produce a computer-implemented process such that the instructions which execute on the computer, processor, or other programmable apparatus provide steps for implementing the functions specified in the flowcharts block(s), step(s), or operation(s).

Accordingly, blocks, steps, or operations of the flowcharts support combinations of means for performing the specified functions, combinations of steps for performing the specified functions and program instruction means for performing the specified functions. It will also be understood that one or more blocks, steps, or operations of the flowcharts, and combinations of blocks, steps, or operations in the flowcharts, can be implemented by special purpose hardware-based computer systems which perform the specified functions or steps, or combinations of special purpose hardware and computer instructions.

In this regard, one exemplary embodiment of a method for presenting burst images as illustrated in FIG. 4 may include providing for a presentation of a sample burst image at 400. In this regard, the sample burst image may be one of the plurality of burst images. Further, the exemplary method may include receiving a selected location at 410. In various exemplary embodiments, the selected location may be within the presentation of the sample burst image. Additionally, in some exemplary embodiments, the selected location may be received from a touch screen display.

The exemplary method of FIG. 4 may also include providing for a presentation of a plurality of burst image fragments at 420. The burst image fragments may be associated with respective ones of the burst images. In this regard, the burst image fragments may be portions of respective ones of the burst images, and the portions of each burst image may be determined based on the selected location. Further, in some exemplary embodiments, the presentation of the plurality of burst image fragments may be provided for at a full resolution. Also, in some exemplary embodiments, the burst image fragments may be enlarged portions of each of the burst images.

Another exemplary embodiment of a method for presenting burst images as illustrated in FIG. 5 may include receiving a plurality of burst images at 500. In various exemplary embodiments, the burst images may be images that were captured in rapid succession, images having different focus parameters, and/or images having different exposure parameters.

The exemplary method of FIG. 5 may further include providing for a presentation of a sample burst image at 510. In this regard, the sample burst image may be one of the plurality of burst images. Further, the exemplary method may include receiving a selected location at 520. In various exemplary embodiments, the selected location may be within the presentation of the sample burst image. Additionally, in some exemplary embodiments, the selected location may be received from a touch screen display.

The exemplary method of FIG. 5 may also include providing for a presentation of a plurality of burst image fragments at 530. The burst image fragments may be associated with respective ones of the burst images. In this regard, the burst image fragments may be portions of respective ones of the burst images, and the portions of each burst image may be determined based on the selected location. Further, in some exemplary embodiments, the presentation of the plurality of burst image fragments may be provided for at a full resolution. Also, in some exemplary embodiments, the burst image fragments may be enlarged or magnified portions of each of the burst images.

The exemplary method may further include receiving a selection of a particular burst image at 540 and associating the selected location with the particular burst image at 550. The exemplary method of FIG. 5 may also include generating a composite image based on the particular burst image and the selected location. Further, in some exemplary embodiments, the method may also include providing for the presentation of the composite image.

Many modifications and other exemplary embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
providing for a presentation of a sample image on a touch screen, the sample image being one of a plurality of images;
receiving user selection of a location within the presentation of the sample image;
providing for a presentation of an image fragment associated with one of the plurality of images, the image fragment being a portion of one of the plurality of images determined based on the selected location;
in response to a user moving a finger across the touch screen, providing for a presentation of other image fragments;
receiving a selection of a particular image;
associating the selected location with the particular image; and
generating a composite image based on the particular image and the selected location.

2. The method of claim 1, wherein the plurality of images are burst images.

3. The method of claim 1, wherein the plurality of images have different focus parameters.

4. The method of claim 3, wherein the composite image comprises portions of images having different focus parameters.

5. The method of claim 1, wherein the plurality of images have different exposure parameters.

6. The method of claim 1, wherein the composite image comprises portions of images having different exposure parameters.

7. The method of claim 1 further comprising automatically moving the presentation of the image fragment.

8. An apparatus comprising a processor and a memory including computer program code, the memory and the computer program code configured to, with the processor, cause the apparatus at least to:
provide for a presentation of a sample image on a touch screen, the sample image being one of a plurality of images;
receive user selection of a location within the presentation of the sample image;
provide for a presentation of an image fragment associated with one of the plurality of images, the image fragment being a portion of one of the plurality of images determined based on the selected location;
in response to a user moving a finger across the touch screen, provide for a presentation of other image fragments;
receive a selection of a particular image;
associate the selected location with the particular image; and
generate a composite image based on the particular image and the selected location.

9. The apparatus of claim 8, wherein the plurality of images are burst images.

10. The apparatus of claim 8, wherein the plurality of images have different focus parameters.

11. The apparatus of claim 10, wherein the composite image comprises portions of images having different focus parameters.

12. The apparatus of claim 8, wherein the plurality of images have different exposure parameters.

13. The apparatus of claim 8, wherein the composite image comprises portions of images having different exposure parameters.

14. The apparatus of claim 8, wherein the processor is further configured to automatically move the presentation of the image fragment.

15. A computer program product comprising at least one non-transitory computer-readable storage medium having executable computer-readable program code portions stored therein, the computer-readable program code portions comprising:
a first program code portion configured to provide for a presentation of a sample image on a touch screen, the sample image being one of a plurality of images;
a second program code portion configured to receive user selection of a location within the presentation of the sample image;
a third program code portion configured to provide for a presentation of an image fragment associated with one of the plurality of images, the image fragment being a portion of one of the plurality of images determined based on the selected location;
a fourth program code portion configured, in response to a user moving a finger across the touch screen, to provide for a presentation of other image fragments;
a fifth program code portion configured to receive a selection of a particular image;
a sixth program code portion configured to associate the selected location with the particular image; and
a seventh program code portion configured to generate a composite image based on the particular image and the selected location.

16. The computer program product of claim 15, wherein the plurality of images are burst images.

17. The computer program product of claim 15, wherein the plurality of images have different focus parameters.

18. The computer program product of claim 17, wherein the composite image comprises portions of images having different focus parameters.

19. The computer program product of claim 15, wherein the plurality of images have different exposure parameters.

20. The method of claim 19, wherein the composite image comprises portions of images having different exposure parameters.

* * * * *